(12) United States Patent
Kanarek

(10) Patent No.: US 12,081,051 B1
(45) Date of Patent: Sep. 3, 2024

(54) PORTABLE POWER APPARATUS, SYSTEM, AND METHOD OF CHARGING SAME USING AN ELECTRIC VEHICLE CHARGING STATION PROVIDING RAPID CHARGE TIMES

(71) Applicant: Ross Kanarek, Plainview, NY (US)

(72) Inventor: Ross Kanarek, Plainview, NY (US)

( * ) Notice: Subject to any disclaimer, the term of this patent is extended or adjusted under 35 U.S.C. 154(b) by 0 days.

(21) Appl. No.: 18/236,513

(22) Filed: Aug. 22, 2023

Related U.S. Application Data

(60) Provisional application No. 63/469,686, filed on May 30, 2023.

(51) Int. Cl.
H02J 7/00 (2006.01)
H02J 7/34 (2006.01)

(52) U.S. Cl.
CPC ........ *H02J 7/0042* (2013.01); *H02J 7/00032* (2020.01); *H02J 7/0013* (2013.01); *H02J 7/34* (2013.01)

(58) Field of Classification Search
CPC .................................................... H02J 7/0042
USPC ........................................................ 320/109
See application file for complete search history.

(56) References Cited

U.S. PATENT DOCUMENTS

| | | | | |
|---|---|---|---|---|
| 10,811,885 | B2 * | 10/2020 | Fry | H02J 7/0045 |
| 2017/0066342 | A1 * | 3/2017 | Butler | H02J 7/005 |
| 2018/0323621 | A1 * | 11/2018 | Fry | H02J 7/0013 |
| 2022/0111747 | A1 * | 4/2022 | Goei | B60L 53/66 |
| 2022/0185137 | A1 * | 6/2022 | Cesiel | B60L 53/16 |
| 2022/0200303 | A1 * | 6/2022 | Swamy | H02J 7/0013 |
| 2023/0318316 | A1 * | 10/2023 | Brochtrup | H02J 7/0013 |
| | | | | 320/112 |

* cited by examiner

*Primary Examiner* — Yalkew Fantu
(74) *Attorney, Agent, or Firm* — Shore IP Group, PLLC; Sean R. Wilsusen

(57) ABSTRACT

A portable power apparatus includes a housing, a battery, a first charging port, a second charging port, a first power supply port, a second power supply port, and a communication module. The first charging port includes at least five pins and is configured to receive a first input voltage. The second charging port is configured to receive a second input voltage that is less than the first input voltage. The first power supply port is configured to deliver a first output voltage. The second power supply port is configured to deliver a second output voltage that is greater than the first output voltage. The communication module is configured to communicate with a source of electrical energy and includes a transmitter configured to communicate that the battery is configured to receive the first input voltage.

19 Claims, 7 Drawing Sheets

PORTABLE POWER APPARATUS, SYSTEM, AND METHOD OF CHARGING SAME USING AN ELECTRIC VEHICLE CHARGING STATION PROVIDING RAPID CHARGE TIMES

CROSS-REFERENCE TO RELATED APPLICATION

The present non-provisional patent application claims priority to U.S. Provisional Patent Application No. 63/469,686, filed on May 30, 2023, the entire contents of which are incorporated by reference herein.

FIELD

The present disclosure relates to portable power and, more particularly, to a portable power apparatus, system, and method of charging the portable power apparatus and system using an electric vehicle charging station.

BACKGROUND

Audiovisual equipment is often power hungry, partly because of larger imaging sensors, as well as the advent of brighter output LED lighting. In various filming and production locations, access to the traditional electric power system is often unavailable. To overcome the lack of traditional power and to meet the necessary portability and high power demands of audiovisual equipment, the video and cinema production industry typically uses generators (e.g., mobile, diesel generators) to supply ample power for their equipment. However, such generators can cause unwanted air pollution and sound pollution, which could potentially violate federal, local, or state regulations.

One such solution for providing a large amount of power portably is the use of high-performance batteries. Although battery technology has evolved in a manner which may be sufficient to provide ample power to the high demands of audiovisual equipment, it typically takes a lot of time to sufficiently charge the batteries. Further, the rate at which batteries are able to be charged is generally limited by the innate output voltage of the battery. While battery technology is evolving to decrease the time it takes to charge a battery, supplying the batteries with enough power to charge faster remains a problem.

The utilization of home electrical service or industrial electric service for charging high-performance batteries might not be a sufficient solution because the charge output is limited (e.g., only 12 kw, at best), and the consumption needs of cinematic productions, for instance, are often well in excess of 12 kw.

SUMMARY

Electric vehicle ("EV") superchargers are increasingly available throughout the country and represent a viable option for relatively rapid charging some batteries with large amounts of power. However, the infrastructure and network of EV superchargers are not yet capable of charging devices other than EVs. This limitation is due to battery systems not having proper mechanical interconnects or communication protocols to connect to the EV charging networks.

Provided in accordance with aspects of the present disclosure is a portable power apparatus including a housing, a battery arranged in the housing, a first charging port, a second charging port, a first power supply port, a second power supply port, and a communication module. The first charging port is disposed in electrical communication with the battery and includes at least five pins. The first charging port is configured to receive a first input voltage, which is configured to charge the battery. The second charging port is disposed in electrical communication with the battery, and is configured to receive a second input voltage, which is configured to charge the at least one battery. The second input voltage is less than the first input voltage. The first power supply port is disposed in electrical communication with the battery and is configured to deliver a first output voltage supplied by the battery. The second power supply port is disposed in electrical communication with the battery and is configured to deliver a second output voltage supplied by the battery. The second output voltage is greater than the first output voltage. The communication module is configured to communicate with a source of electrical energy and includes a transmitter configured to communicate that the battery is configured to receive the first input voltage.

In an aspect of the present disclosure, the source of electrical energy is an electric vehicle charging station configured to output the first input voltage.

In an aspect of the present disclosure, the first charging port includes at least seven pins. At least two pins of the seven pins are configured to receive a direct current input current.

In an aspect of the present disclosure, the pins include at least one communication pin configured to communicate with the electric vehicle charging station, and the communication module is configured to communicate electrical charging data to or from the electric vehicle charging station via the communication pin.

In an aspect of the present disclosure, the first output voltage delivered by the first power supply port is about 14.4 volts.

In an aspect of the present disclosure, the second output voltage delivered by the second power supply port is about 28.8 volts.

In an aspect of the present disclosure, the portable power apparatus includes a third power supply port disposed in electrical communication with the battery. The third power supply port is configured to deliver a third output voltage supplied by the battery. The third output voltage is one of about 28 volts or about 48 volts.

In an aspect of the present disclosure, the portable power apparatus includes a fourth power supply port disposed in electrical communication with the battery. The fourth power supply port is configured to deliver a fourth output voltage supplied by the battery. The fourth output voltage is at least one of 110 volts or 220 volts.

In an aspect of the present disclosure, the second charging port is configured to receive at least one of 110 volts or 220 volts.

Provided in accordance with aspects of the present disclosure is a portable power system including a housing, a battery arranged in the housing, a first charging port, a first power supply port, a second power supply port, and a computer. The first charging port is disposed in electrical communication with the battery and includes at least five pins. The first charging port is configured to receive a first input voltage, which is configured to charge the at least one battery. The first power supply port is disposed in electrical communication with the battery and is configured to deliver a first output voltage supplied by the battery. The second power supply port is disposed in electrical communication with the battery and is configured to deliver a second output voltage supplied by the battery. The second output voltage is greater than the first output voltage. The computer is in communication with the battery, and includes a processor, at a memory, and a transmitter. The memory stores computer instructions configured to instruct the processor to cause the transmitter to communicate with a source of electrical energy indicating that the battery is capable of receiving the first input voltage.

In an aspect of the present disclosure, pins include at least one communication pin configured to communicate with an electric vehicle charging station. The memory stores computer instructions configured to instruct the processor to cause the transmitter to communicate electrical charging data to or from the electric vehicle charging station via the communication pin.

In an aspect of the present disclosure, the first output voltage delivered by the first power supply port is about 14.4 volts.

In an aspect of the present disclosure, the second output voltage delivered by the second power supply port is about 28.8 volts.

In an aspect of the present disclosure, the portable power system includes a third power supply port disposed in electrical communication with the battery. The third power supply port is configured to deliver a third output voltage supplied by the battery. The third output voltage is at least one of 110 volts or 220 volts.

In an aspect of the present disclosure, the memory stores computer instructions configured to instruct the processor to cause the battery to deliver the first output voltage, the second output voltage, or the third output voltage.

In an aspect of the present disclosure, the portable power system includes a second charging port disposed in electrical communication with the battery. The second charging port is configured to receive a second input voltage, which is configured to charge the battery. The second input voltage is less than the first input voltage.

In an aspect of the present disclosure, the second charging port is configured to receive at least one of 110 volts or 220 volts to charge the battery.

Provided in accordance with the present disclosure is a method of charging a portable power apparatus including providing a portable power apparatus including a housing, a battery arranged in the housing, a charging port, a first power supply port, a second power supply port, and a communication module. The charging port is disposed in electrical communication with the battery and includes at least five pins. The charging port is configured to receive a first input voltage, which is configured to charge the battery. The first power supply port is disposed in electrical communication with the battery and is configured to deliver a first output voltage supplied by the battery. The second power supply port is disposed in electrical communication with the battery and is configured to deliver a second output voltage supplied by the battery. The second output voltage is greater than the first output voltage. The communication module is configured to communicate with an electric vehicle charging station and includes a transmitter configured to communicate that the battery is configured to receive the first input voltage. The method also includes communicating, by the transmitter of the communication module, with the electric vehicle charging station that the battery is configured to receive the first input voltage. The method includes receiving the first charging input voltage from the electric vehicle charging station and charging the battery by the first input voltage received from the electric vehicle charging station.

In an aspect of the present disclosure, the charging port includes at least seven pins. At least one pin of the at least seven pins receives a direct current input current.

In an aspect of the present disclosure, the method includes supplying electrical power to charge an audiovisual device utilizing the first output voltage or the second output voltage delivered by the battery.

BRIEF DESCRIPTION OF THE DRAWINGS

Various aspects and features of the present disclosure are described hereinbelow with reference to the drawings wherein.

DETAILED DESCRIPTION

Figure 1:
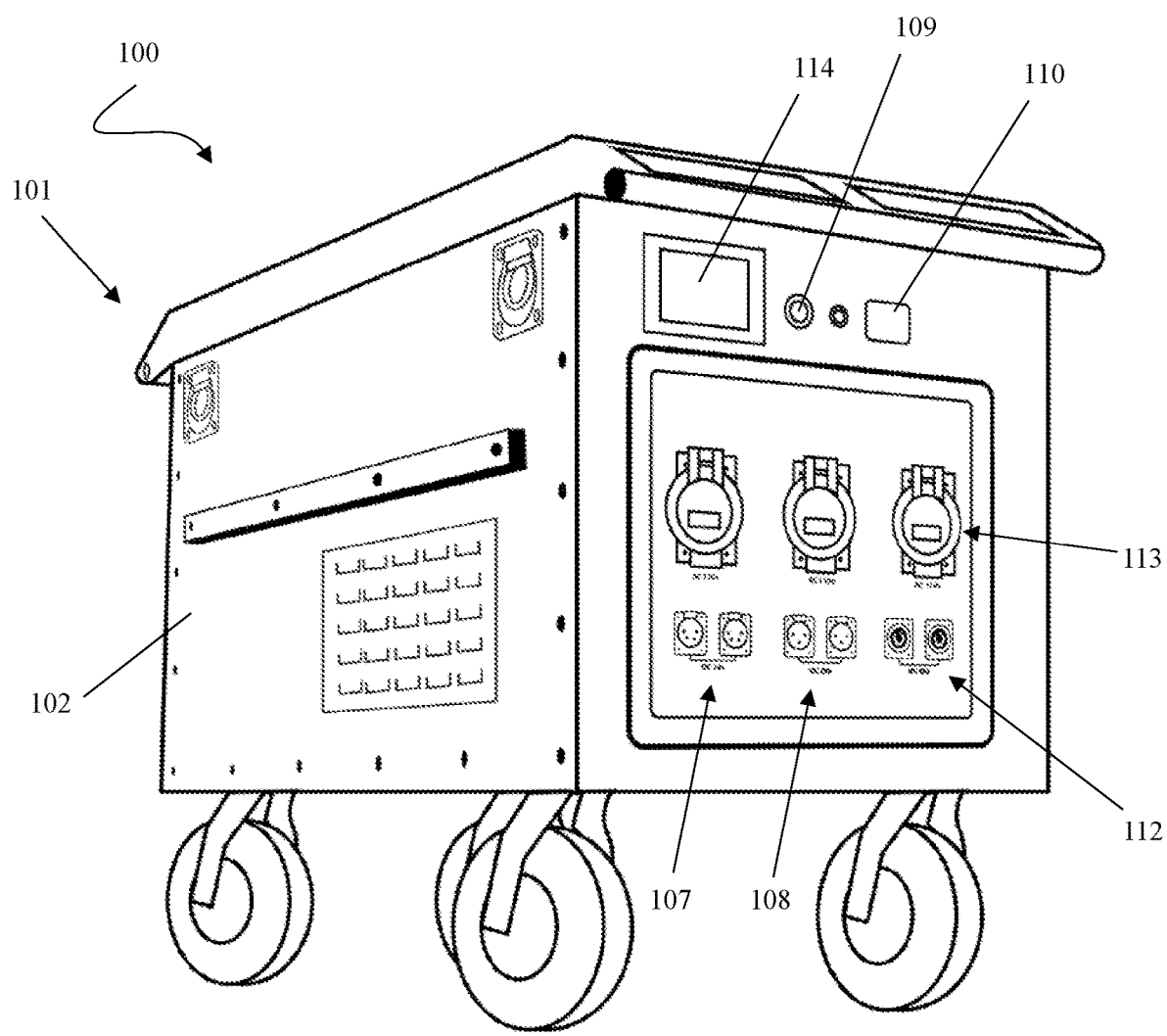
FIG. 1 is a perspective view of a portable power apparatus and system according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The phrases "mount plate," and "battery mount plate" may be used interchangeably herein. The phrases "battery," "battery pack," and "pack" may be used interchangeably herein.

The ability to provide reliable, clean, portable, and audiovisual-specific power output has become increasingly necessary in the video and cinema production industry, for instance. Additionally, the ability to provide such power in a relatively rapid manner is also frequently desired or necessary.

During the production and filming of motion pictures, for example, cinematic cameras and lighting often have high power demands which require the supply of high voltage power. While high voltage batteries can be employed as a platform for high power delivery since they require less current (and also less heat, and less resistance with cabling), operational runtime becomes an issue.

For example, camera operators may desire high-capacity battery packs, (e.g., battery packs exceeding 98 watt hours (Wh) or exceeding 150 Wh), and thus conventional battery packs might not be sufficient to support power hungry audiovisual equipment. Thus, there is an increasing demand for high voltage battery packs with capacities of 200 Wh or more.

However, with higher capacity battery packs, charging times can become a limiting factor to the use of such battery packs. The challenge of charging battery packs is increasingly more difficult to overcome when access to a traditional power supply is limited, and when the use of generators (e.g., diesel-powered generators) is limited or restricted.

The portable power apparatus, system and method described herein can be charged rapidly using electric vehicle ("EV") charging stations, and can be employed to charge any of a low voltage battery pack (e.g., about 14 V), a dual voltage battery pack (e.g., about 14 V, about 24 V, about 28 V and/or about 48 V), a multiple voltage battery pack having more than 2 voltage modes, or a dedicated high voltage battery pack (e.g., about 24 V, about 28 V, or about 48 V). That is, the portable power apparatus can be charged by supplying a high voltage input current from an EV charging station. Additionally, the portable power apparatus can be charged using 110 V and/or 220 V, and can be used to charge batteries and/or devices by outputting 110 V and/or 220 V.

Exemplary embodiments of the present inventive concept provide a portable power system 100 capable of receiving power from a source of electrical energy through at least one charging port, and capable of delivering power through at least two power supply ports.

Referring particularly to FIGS. 1-5, a portable power apparatus 101 includes a housing 102 and at least one battery 103 (FIG. 5) arranged in the housing 102. Any reasonable number and size of batteries may be arranged in any reasonable manner within the housing 102. Additionally, an embodiment of the portable power apparatus 101 includes a first charging port 104 and a second charging portion 106, which are each configured to be used to charge the at least one battery 103. The portable power apparatus 101 also includes a first power supply port 107 and a second power supply port 108, which are each configured to deliver an output voltage supplied by the at least one battery 103. Further, the portable power apparatus 101 includes a communication module 109 that is configured to communicate with a source of electrical energy, such as an EV charging station.

Figure 5:
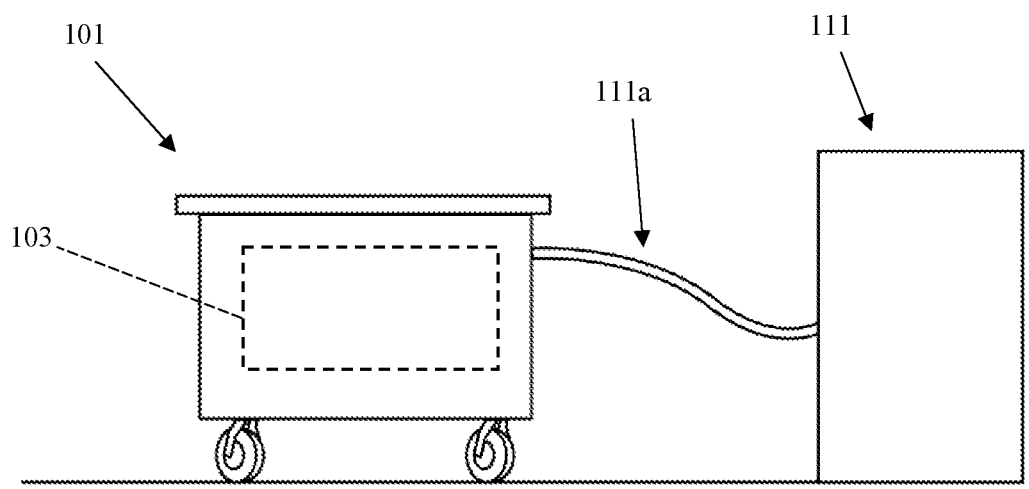
FIG. 5 is a schematic view of the portable power apparatus of FIG. 1 connected to an electric vehicle charging station.

The battery 103 is shown schematically in FIG. 5 and may include, but is not limited to, Lithium Ion, Lithium Iron, Phosphate, and/or Sodium Ion chemistries. As discussed in further detail herein, the at least one battery 103 is configured to be charged using a standard alternating current ("AC") mains connection (e.g., 110 V and/or 220 V), and is also configured to be charged by receiving AC or direct current ("DC"). As an example, the battery 103 may receive up to about 1000 V and about 500 amps (A), or about 360 kilowatts (kW) by leveraging and being compatible with Level 1, Level 2, and Level 3 EV charging networks and charging stations. Further, to help ensure safe and efficient charging, the battery 103 may be equipped with reinforced charge input cabling and a communication system (discussed herein with regard to FIGS. 6 and 7, for instance) to transmit data to EV charging stations to enable charging therefrom.

Figure 3:
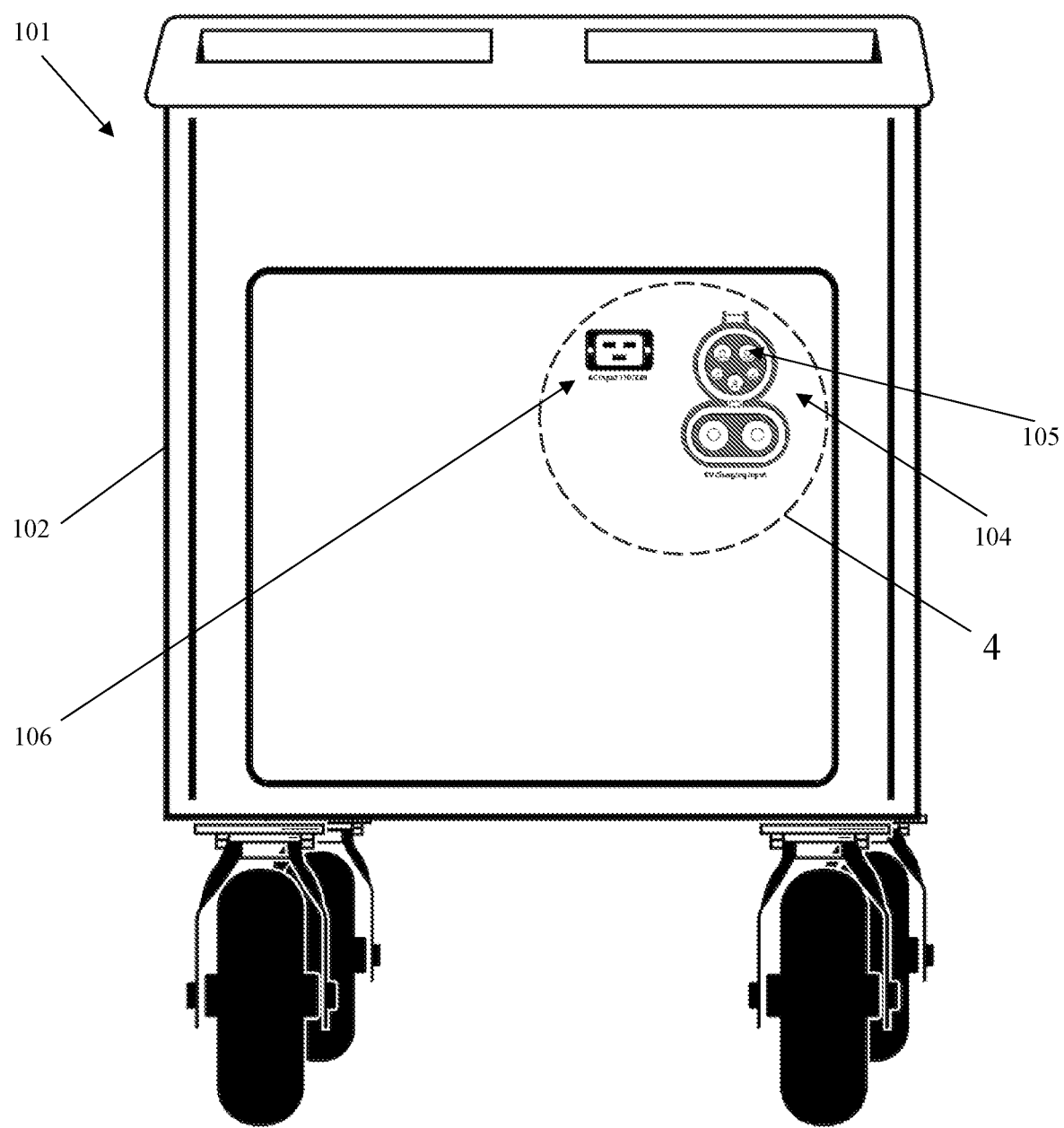
FIG. 3 is an end view of a second side of the portable power apparatus of FIG. 1.
Figure 4:
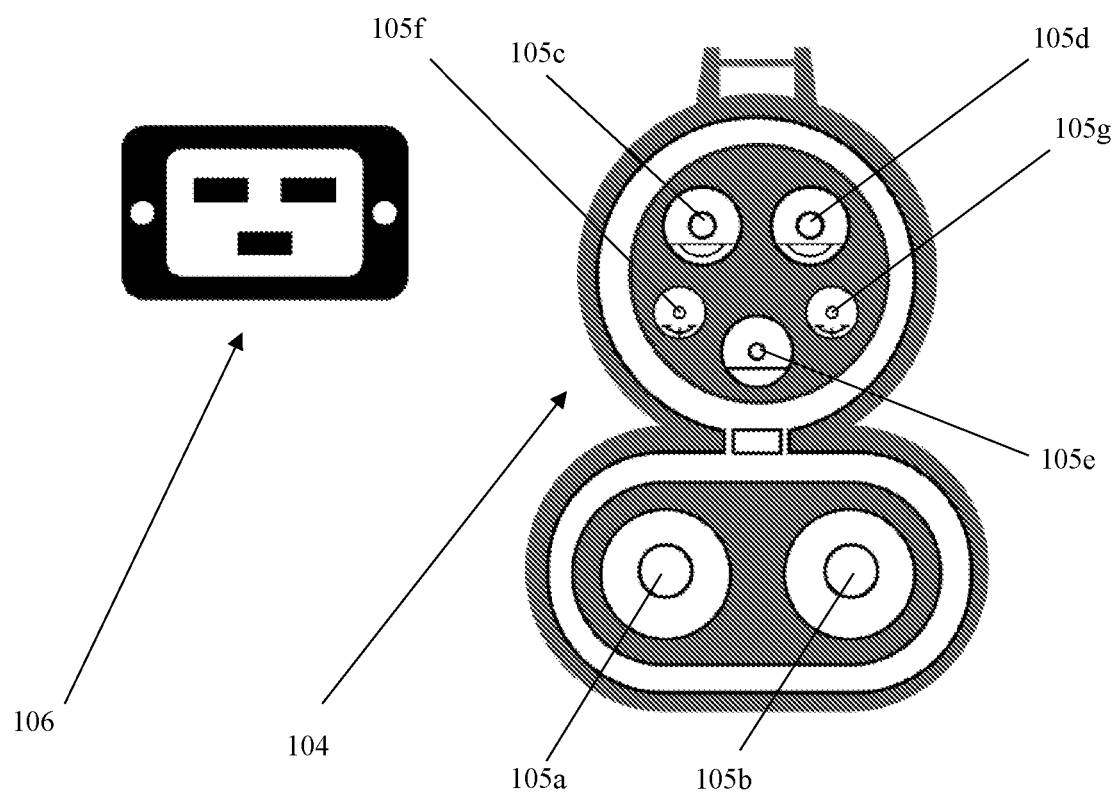
FIG. 4 is an enlarged view of the area indicated in FIG. 3.

The first charging port 104 and the second charging port 106 of the portable power apparatus 101 are shown in FIGS. 3 and 4. Each of the first charging portion 104 and the second charging port 106 is disposed in electrical communication with the battery 103. The first charging port 104 is configured to receive a first input voltage, and the first input voltage is configured to charge the battery 103. Additionally, the second charging port 106 is configured to receive a second input voltage, and the second input voltage is configured to charge the battery 103. In embodiments, the first input voltage is greater than the second input voltage, or the second input voltage is greater than the first input voltage. While two charging ports are described and shown, the portable power apparatus 101 may include more or fewer charging ports. For instance, the portable power apparatus 101 may only include only the first charging port 104.

With continued reference to FIGS. 3 and 4, the first charging port 104 includes a plurality of pins 105. In embodiments, the first charging port 104 includes five pins 105. In such embodiments, the first charging port 104 is configured to engage a plug having five receptacles, such as Level 1- or a Level 2-type charger, including a J1772 connector. In the embodiment illustrated in FIGS. 3 and 4, the first charging port 104 includes seven pins 105. Here, the first charging port 104 is configured to engage a plug having seven receptacles, such as Combined Charging Standard 1 ("CCS1") connector, which is often used for charging EVs rapidly using DC. The first charging port 104 may be arranged to fit any electric vehicle charging plug configuration, such as without limitation, Type 1, Type 2, CCS, or CHAdeMO connection plugs.

The first charging port 104 can support DC to DC fast charging of battery 103. The first charging port 104 can support Level-3 direct current fast charging (DCFC) of the portable power apparatus 101. DCFC charging employs DC to charge a battery without needing to go through an onboard AC battery charger. This charging level allows for a much higher capacity battery charging system. As an example, DCFC chargers employ 480 V electrical service. For example, a 100 kW DCFC charger can recharge a 100 kWh battery in about an hour.

Referring now to FIG. 5, the portable power apparatus 101 is shown schematically connected to an EV charging station 111 via an appropriate cable 111a. Here, the EV charging station 111 is the source of electrical energy and is configured to output the first voltage (e.g., up to about 1000 V and about 500A of DC) to the at least one battery 103 of the portable power apparatus 101.

Referring back to FIG. 4, an enlarged view of the first charging port 104 and the second charging port 106 is shown. In the illustrated embodiment, the second charging port 104 includes seven pins 105: a first pin 105a, a second pin 105b, a third pin 105c, a fourth pin 105d, a fifth pin 105e, a sixth pin 105f, and a seventh pin 105g. Here, it is envisioned that the first pin 105a and the second pin 105b are configured to receive a DC input current, with one of the first pin 105a or the second pin 105b configured to receive a positive DC input current, and with the other of the first pin 105a or the second pin 105b configured to receive a negative DC input current. In embodiments, the third pin 105c and the fourth pin 105d are configured for supplying positive voltage to the at least one battery 103, and the fifth pin 105e is configured for connection to the ground of the at least one battery 103 and to a ground of the housing 102. In disclosed aspects, the sixth pin 105f is a proximity line and is used to help communicate to the source of electricity (e.g., the EV charging station 111) that its connector is securely latched or engaged with the first charging port 104. In embodiments, the seventh pin 105g is a pilot communication line and is used to provide communication between the at least one battery 103 and the source of electricity (e.g., the EV charging station 111), such as indicating that the at least one battery 103 is configured to receive the particular voltage supplied by the EV charging station 111.

With further regard to the seventh pin 105g, the present disclosure contemplates the use of all or any of several types of pilot communication lines or communication protocols when charging on EV charging networks. One example of a pilot communication line uses a high-level communication line to handle load balancing and for payment purposes. In this use, the proximity line (e.g., the sixth pin 105f) may be used to communicate via pulse width modulation (PWM) to help ensure a safe and secure connection. The combination of this pilot communication line and this proximity line may allow for greater interoperability between the at least one battery 103 and the source of electricity (e.g., the EV charging station 111). This is generally the type of communication line and proximity line that is used with EV batteries. Thus, when such lines are incorporated into the portable power apparatus 101, the EV charging station 111 (such as a Tesla® Supercharger) would be unable to differentiate the at least one battery 103 of the portable power apparatus 101 from a traditional EV battery.

Another example of a pilot communication line provides a charged state based on a negative 12 V to positive 12 V standardized system, with the acceptance of current the at least one battery 103 can handle determined by a 1 kHz square wave duty cycle. A third type of pilot communication line provides a 500 V DC supply to the source of electricity (e.g., the EV charging station 111). This communication takes place over a Controller Area Network (CAN bus), where information relating to the charging rate and state-of-charge of the at least one battery 103 are exchanged.

In embodiments where the first charging port 104 includes five pins 105, the five pins 105 may include and function similarly to the third pin 105c, the fourth pin 105d, the fifth pin 105e, the sixth pin 105f, and the seventh pin 105g, as described above.

Additionally, it is envisioned that the portable power apparatus 101 includes more than one first charging port 104. For instance, one first charging port 104 may include seven pins 105, and a second first charging port 104 may include five pins 105.

Referring back to FIGS. 3 and 4, the second charging port 106 is shown. The second charging port 106 is shown having three receptacles and is configured to engage a plug having two or three pins. In this embodiment, the second charging port 106 is configured to engage a plug and source of energy that delivers 110 V and/or 220 V of AC, for example, to charge the at least one battery 103 of the portable charging apparatus 101. The inclusion of the second charging port 106 may be helpful to charge the at least one battery 103 when access to an EV charging station 111 is not available, for instance.

In embodiments where the at least one battery 103 includes more than one battery, it is envisioned that the first charging port 104 is used to charge some of the batteries, and the second charging port 106 is used to charge other batteries. Alternatively, both of the first charging port 104 and the second charging port 106 can be used to charge the same battery(ies) of the at least one battery 103. Further, it is envisioned that the portable power apparatus 101 includes more than one second charging port 106.

Figure 2:
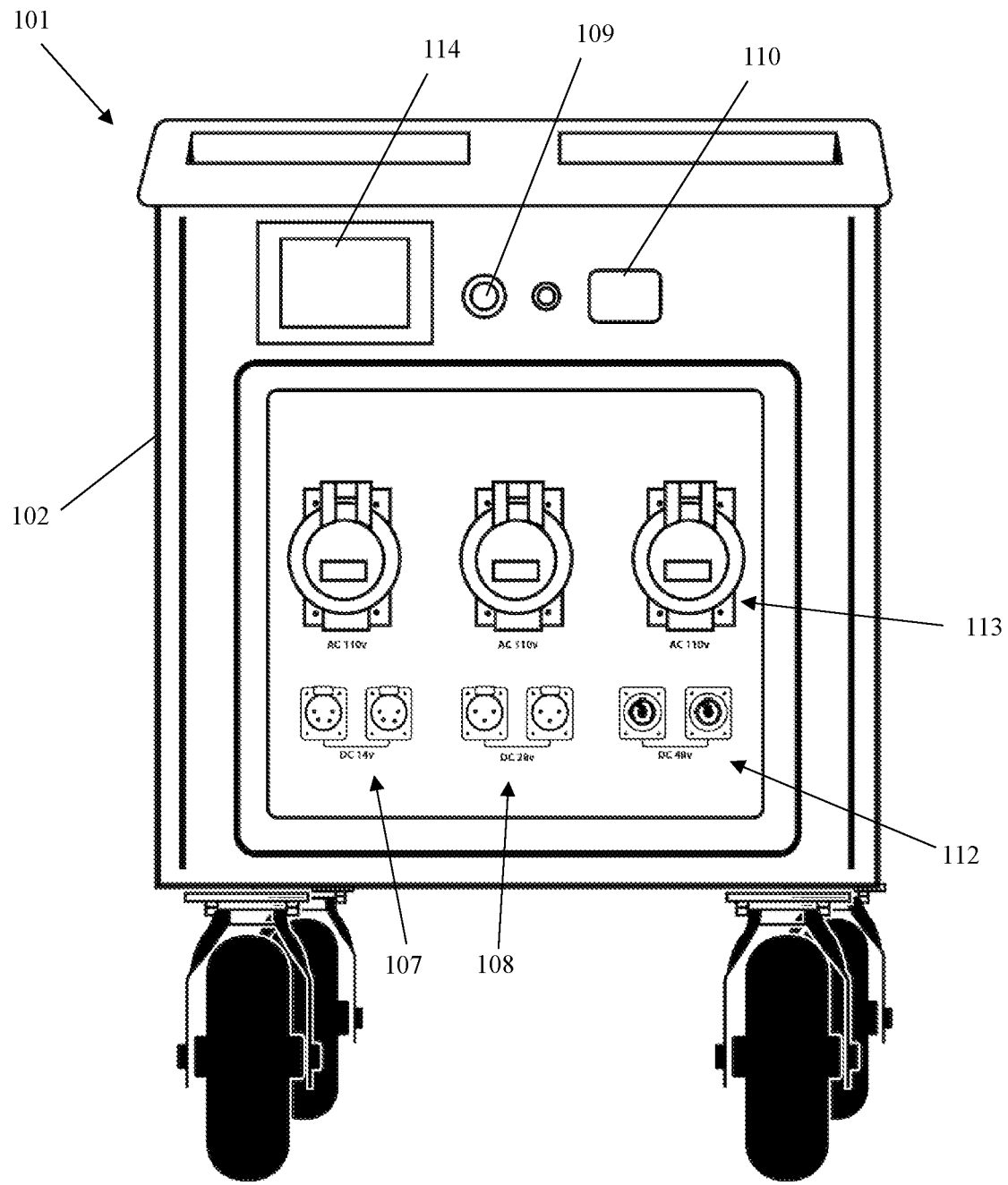
FIG. 2 is an end view of a first side of the portable power apparatus of FIG. 1.

Turning now to FIGS. 1 and 2, the power supply ports are shown. In particular, the illustrated embodiment of the portable power apparatus 101 includes the first power supply port 107, the second power supply port 108, a third power supply port 112, and a number of fourth power supply ports 113, which are each configured to deliver an output voltage supplied by the at least one battery 103.

While the illustrated embodiment shows each of the first power supply port 107, the second power supply port 108, and the third power supply port 112 having two receptacles, and the fourth power supply port 113 having three receptacles, each power supply port may include more or fewer receptacles than what is depicted in the illustrated embodiment. Further, the portable power apparatus 101 may include more or fewer power supply ports than is shown. However, the inclusion of both the first power supply port 107 and the second power supply port 108 is particularly useful for use in the video and cinema production industry due to the power supply requirements of the industry-specific needs.

In embodiments, the first power supply port 107 is configured to deliver an output voltage of about 14.4 V (e.g., DC), and the second power supply port 108 is configured to deliver an output voltage of about 28.8 V (e.g., DC). The ability to deliver output voltages of 14.4 V and 28.8 V is useful for supplying power to various audiovisual devices and/or to batteries and battery mounts used in connection with such devices, such as dual voltage battery packs.

Additionally, and as shown in FIGS. 1 and 2, embodiments of the portable power apparatus 101 also include the third power supply port 112. In one aspect, the third power supply port 112 is configured to deliver an output voltage of 28 V (e.g., DC). In another aspect, the third power supply port 112 is configured to deliver an output voltage of 48 V (e.g., DC). In yet another aspect, the third power supply port 112 includes a first receptacle configured to deliver an output voltage of 28 V and a second receptacle configured to deliver an output voltage of 48 V. There are a number of specialized audiovisual devices that require or would benefit from receiving such power, such that the ability of the portable power apparatus 101 to include the third power supply port 112 supplying output voltages of 28 V and/or 48 V would be provide an additional benefit to the video and cinema production industry.

With continued reference to FIGS. 1 and 2, embodiments of the portable power apparatus 101 also include the fourth power supply port 113. In aspects, the fourth power supply port 113 is configured to deliver an output voltage of 110 V of AC and/or 220 V of AC. The inclusion of the fourth power supply port 113 further increases the versatility of the portable power apparatus 101.

The communication module 109 and a transmitter 110 are schematically illustrated in FIGS. 1 and 2. The communication module 109 includes at least one transmitter 110 and is configured to communicate with a source of electrical energy (e.g., the EV charging station 111). For instance, the communication module 109 may communicate via the at least one transmitter that the at least one battery 103 of the portable power apparatus 101 is configured to receive the voltage supplied by the EV charging station (e.g., up to about 1000 V and about 500A of DC). In embodiments, the transmitter relays this information via the seventh pin 105g of the first charging port 104 (i.e., the pilot communication line), and through the cable 111a to the EV charging station 111. It is also envisioned that the transmitter 110 relays this information from the communication module 109 by a wired or wireless connection (e.g., Bluetooth, WiFi, or cellular network connection), such as a short wave radio communication protocol.

Figure 6:
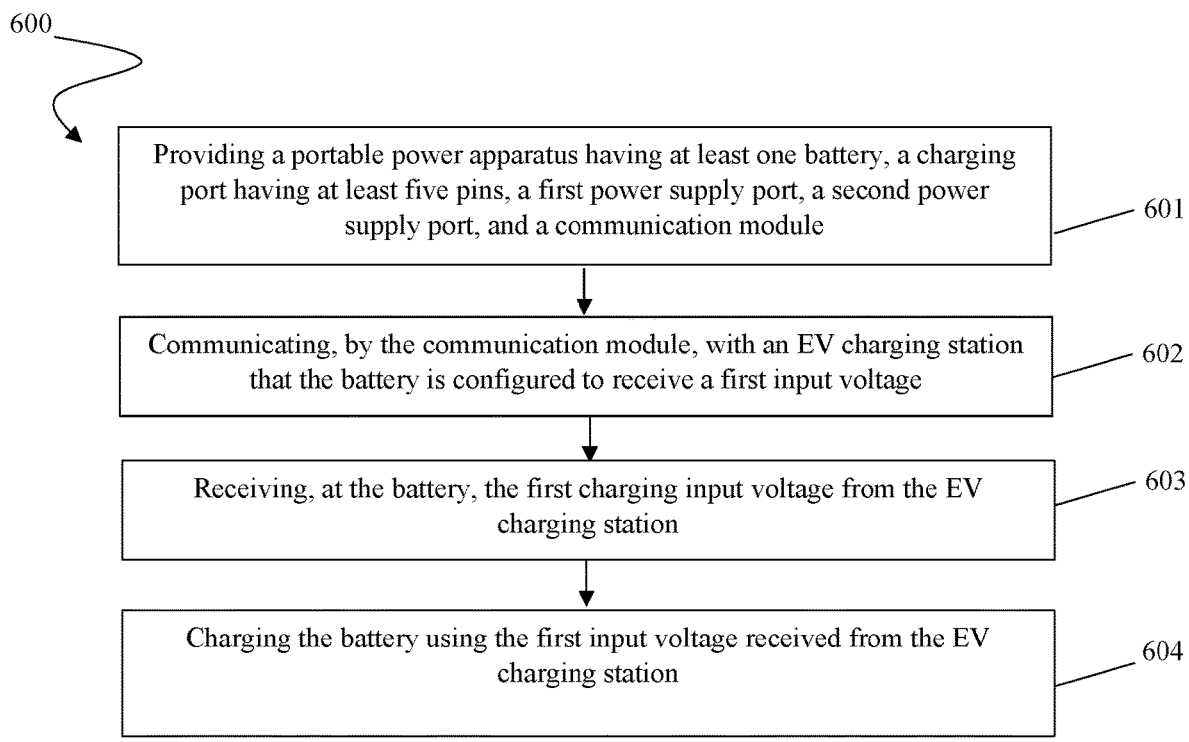
FIG. 6 is a flow chart of a method of charging a portable power apparatus according to aspects of the present disclosure.

Referring particularly to FIG. 6, a method 600 of charging a portable power source includes providing the portable power apparatus having the at least one battery, the charging port having at least five pins, the first power supply port, the second power supply port and the communication module (step 601). The communication module communicates with the EV charging station that the at least one battery is configured to receive the first input voltage (e.g., up to about 1000 V and about 500A of DC) (step 602). The at least one battery receives the first charging input voltage from the EV charging station (step 603). The at least one battery is charged by the first input voltage from the EV charging station (step 604).

In an aspect of the present disclosure, the method 600 includes utilizing at least one pin of the charging port to receive a DC input current.

In an aspect of the present disclosure, the method 600 also includes using the battery to supply electrical power to charge an audiovisual device utilizing the first output voltage of the first power supply port or the second output voltage of the second power supply port.

With reference to FIGS. 1-5, the portable power system 100 of the present disclosure includes the housing 102, the at least one battery 103, the first charging port 104, the first power supply port 107, the second power supply port 108, and a computer 114 (shown schematically in FIG. 1). The first charging port 104 includes at least five pins 105 and is configured to receive a first input voltage (e.g., up to about 1000 V and about 500A of DC) which is configured to charge the at least one battery 103. The first power supply port 107 is configured to deliver a first output voltage (e.g., about 14.4 V) supplied by the at least one battery 103. The second power supply port 108 is configured to deliver a second output voltage (e.g., about 28.8 V) supplied by the at least one battery 103.

The computer 114 is configured to control the operations of the portable power system 100 and/or portable power apparatus 101, as described herein. An exemplary computer structure employable by the computer 114 is described in more detail below with reference to FIG. 7. The computer 114 includes at least one processor, and at least one memory (see, e.g., FIG. 7). The computer 114 also includes the at least one transmitter 110. The memory stores computer instructions configured to instruct the at least one processor to cause the at least one transmitter 110 to communicate with a source of electrical energy (e.g., the EV charging station 111) indicating that the at least one battery 103 is capable of receiving the first input voltage.

In disclosed aspects, the at least five pins 105 of the first charging port 104 includes at least one communication pin (e.g., the seventh pin 105g). Here, the memory stores computer instructions configured to instruct the at least one processor to cause the at least one transmitter 110 to communicate electrical charging data to or from the EV charging station 111 using the at least one communication pin.

As described above with regard to the portable power apparatus 101, the portable power system 100 may also include the second charging port 106 configured to receive 110 V and/or 220 V of AC, for example, to charge the at least one battery 103, the third power supply port 113 configured to deliver 110 V and/or 220 V of AC, for example from the at least one battery 103. In such embodiments, the memory stores computer instructions configured to instruct the at least one processor to cause the at least one battery 103 to deliver the first output voltage, the second output voltage, or the third output voltage.

Figure 7:
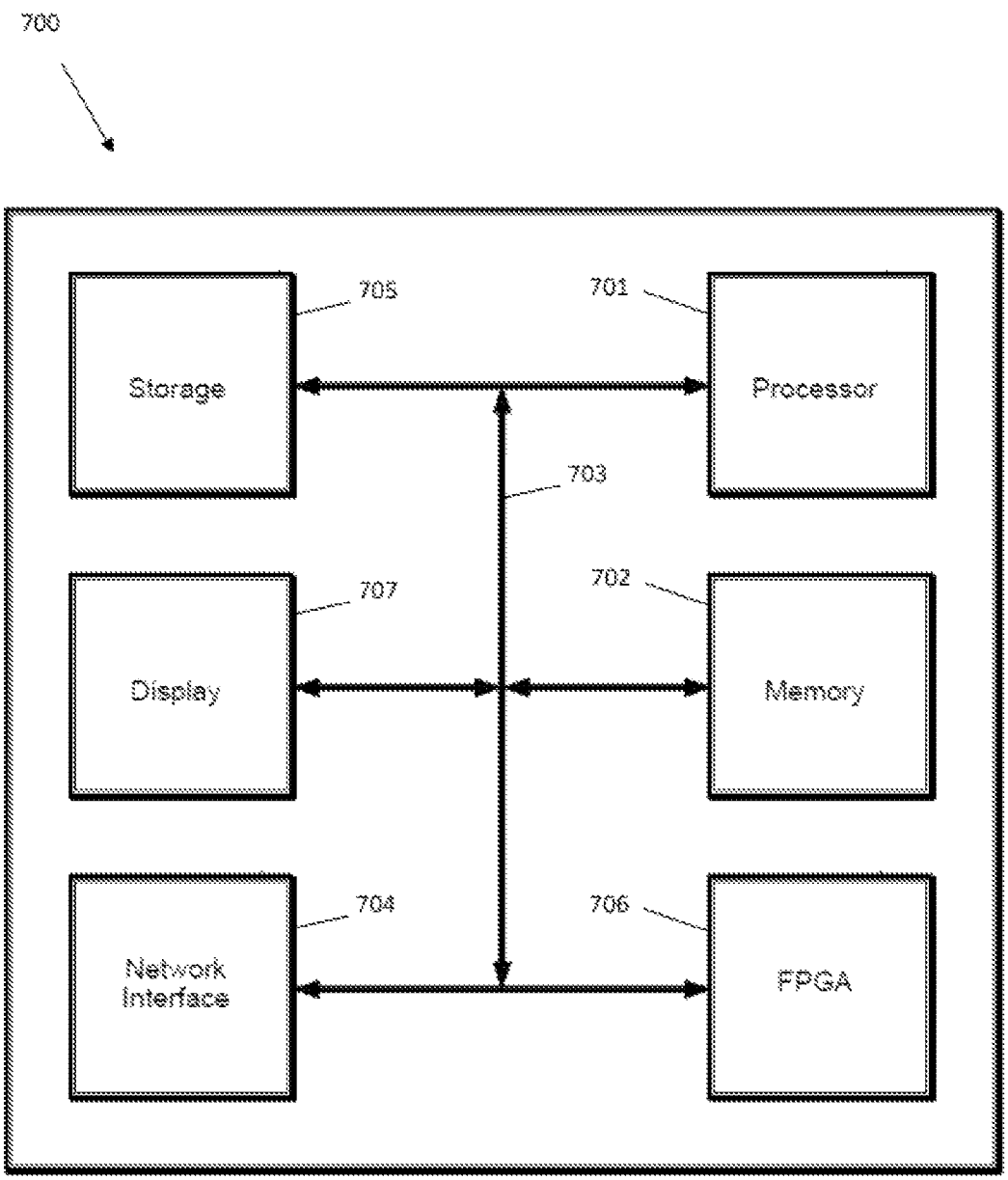
FIG. 7 is a block diagram of an exemplary computer employable by the apparatus, system, and method described herein according to aspects of the present disclosure.

Referring to FIG. 7, a general-purpose computer 700 employable by the portable power system 100 and/or the portable power apparatus 101 is described. The general-purpose computer 700 can be employed by the portable power system 100 and/or the portable power apparatus 101 to perform the various functions described herein. The computer 700 may include a processor 701 connected to a computer-readable storage medium or a memory 702 which may be a volatile type memory, e.g., RAM, or a non-volatile type memory, e.g., flash media, disk media, etc. The processor 701 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 702 can be random access memory, read-only memory, magnetic disk memory, solid state memory, optical disc memory, and/or another type of memory. The memory 702 can communicate with the processor 701 through communication buses 703 of a circuit board and/or through communication cables such as serial ATA cables or other types of cables. The memory 702 includes computer-readable instructions that are executable by the processor 701 to operate the computer 700 to execute the various functions described herein. The computer 700 may include a network interface 704 to communicate (e.g., through a wired or wireless connection) with other computers or a server. A storage device 705 may be used for storing data. The computer 700 may include one or more FPGAs 706. The FPGAs 706 may be used for executing various functions described herein. A display 707 may be employed to display data processed by the computer 700.

During use in the video and cinema production industry, various audiovisual devices often include battery mount plates configured to selectively connect to appropriate batteries. Further, a charging system may include a chargeable or directly powered base unit along with several battery mount plates and several batteries. The battery mount plates are connected to the base, and each battery is mountable to one battery mount plate, for example, to charge the battery by using the powered or charged charging system. To utilize this charging system in connection with the portable power system 100 of the present disclosure, the portable power system 100 is charged (e.g., by plugging the portable power system 100 into an EV charging station 111), the base of the charging system is plugged into one of the power supply ports (e.g., 107, 108, 112 or 113), and the powered or charged charging system is employed to charge one or more batteries. A sufficiently charged battery is removed from the battery mount plate of the charging system, and that battery is then engaged with a similar (or identical) battery mount plate that is engaged with a piece of audiovisual equipment.

Moreover, since the charging station may include more than one battery mount plate and more than one battery, multiple batteries can be charged simultaneously through use of the portable power system 100 thereby enabling power to be supplied to multiple pieces of audiovisual equipment. Additionally, the portable power system 100 is usable to charge multiple charging stations or batteries at once (e.g., with the same or a different amount of voltage) by utilizing the multiple power supply ports (e.g., 107, 108, 112 and 113).

Mount plates having different mounting arrangements for connecting with different types of batteries to a charging station are described in U.S. Pat. No. 10,197,630, the entire contents of which are incorporated by reference herein. A mount plate having various features is described in U.S. Pat. No. 10,841,492, the entire contents of which are incorporated by reference herein.

An exemplary switching circuit is described in U.S. Pat. No. 10,630,095, the entire contents of which are incorporated by reference herein.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A portable power apparatus, comprising:
a housing;
at least one battery arranged in the housing;
a first charging port arranged in the housing and disposed in electrical communication with the at least one battery, the first charging port including at least five electric current input pins, wherein the at least five electric current input pins of the first charging port are arranged to receive electric current output pins of an electric vehicle charging plug therein, wherein the first charging port is configured to receive a first input voltage through at least some of the at least five electric current input pins, and wherein the first input voltage is configured to charge the at least one battery;
a second charging port disposed in electrical communication with the at least one battery, wherein the second charging port is configured to receive a second input voltage, wherein the second input voltage is configured to charge the at least one battery, and wherein the second input voltage is less than the first input voltage;
a first power supply port disposed in electrical communication with the at least one battery, wherein the first power supply is configured to deliver a first output voltage supplied by the at least one battery;
a second power supply port disposed in electrical communication with the at least one battery, wherein the second power supply is configured to deliver a second output voltage supplied by the at least one battery, wherein the second output voltage is greater than the first output voltage; and
a communication module configured to communicate with an electric vehicle charging station configured to output the first input voltage through the electric vehicle charging plug, wherein the communication module includes at least one transmitter configured to communicate that the at least one battery is configured to receive the first input voltage.

2. The portable power apparatus of claim 1, wherein the first charging port includes at least seven pins, wherein at least two pins of the at least seven pins are configured to receive a direct current input current.

3. The portable power apparatus of claim 2, wherein the at least five pins include at least one communication pin configured to communicate with the electric vehicle charging station, wherein the communication module is configured to communicate electrical charging data to or from the electric vehicle charging station via the at least one communication pin.

4. The portable power apparatus of claim 1, wherein the first output voltage delivered by the first power supply port is about 14.4 volts.

5. The portable power apparatus of claim 4, wherein the second output voltage delivered by the second power supply port is about 28.8 volts.

6. The portable power apparatus of claim 5, further including a third power supply port disposed in electrical communication with the at least one battery, wherein the third power supply port is configured to deliver a third output voltage supplied by the at least one battery, and wherein the third output voltage is one of about 28 volts or about 48 volts.

7. The portable power apparatus of claim 6, further including a fourth power supply port disposed in electrical communication with the at least one battery, wherein the fourth power supply port is configured to deliver a fourth output voltage supplied by the at least one battery, and wherein the fourth output voltage is at least one of 110 volts or 220 volts.

8. The portable power apparatus of claim 1, wherein the second charging port is configured to receive at least one of 110 volts or 220 volts.

9. A portable power system, comprising:
a housing;
at least one battery arranged in the housing;
a first charging port arranged in the housing and disposed in electrical communication with the at least one battery, the first charging port including at least five electric current input pins, wherein the at least five electric current input pins of the first charging port are arranged to receive electric current output pins of an electric vehicle charging plug therein, wherein the first charging port is configured to receive a first input voltage through at least some of the at least five electric current input pins, and wherein the first input voltage is configured to charge the at least one battery;
a first power supply port disposed in electrical communication with the at least one battery, wherein the first power supply port is configured to deliver a first output voltage supplied by the at least one battery;
a second power supply port disposed in electrical communication with the at least one battery, wherein the second power supply port is configured to deliver a second output voltage supplied by the at least one battery, wherein the second output voltage is greater than the first output voltage; and
a computer in communication with the at least one battery, the computer including at least one processor, at least one memory, and at least one transmitter, the at least one memory storing computer instructions configured to instruct the at least one processor to cause the at least one transmitter to communicate with an electric vehicle charging station configured to output the first input voltage through the electric vehicle charging plug indicating that the at least one battery is capable of receiving the first input voltage.

10. The portable power system of claim 9, wherein the at least five pins include at least one communication pin configured to communicate with the electric vehicle charging station, wherein the at least one memory stores computer instructions configured to instruct the at least one processor to cause the at least one transmitter to communicate electrical charging data to or from the electric vehicle charging station via the at least one communication pin.

11. The portable power system of claim 10, wherein the first output voltage delivered by the first power supply port is about 14.4 volts.

12. The portable power system of claim 11, wherein the second output voltage delivered by the second power supply port is about 28.8 volts.

13. The portable power system of claim 12, further including a third power supply port disposed in electrical communication with the at least one battery, wherein the third power supply port is configured to deliver a third output voltage supplied by the at least one battery, and wherein the third output voltage is at least one of 110 volts or 220 volts.

14. The portable power system of claim 13, wherein the at least one memory stores computer instructions configured to instruct the at least one processor to cause the at least one battery to deliver the first output voltage, the second output voltage, or the third output voltage.

15. The portable power system of claim 9, further including a second charging port disposed in electrical communication with the at least one battery, wherein the second charging port is configured to receive a second input voltage, wherein the second input voltage is configured to charge the at least one battery, and wherein the second input voltage is less than the first input voltage.

16. The portable power system of claim 15, wherein the second charging port is configured to receive at least one of 110 volts or 220 volts to charge the at least one battery.

17. A method of charging a portable power apparatus, comprising:
   providing a portable power apparatus including:
      a housing;
      at least one battery arranged in the housing;
      a charging port arranged in the housing and disposed in electrical communication with the at least one battery, the charging port including at least five electric current input pins, wherein the at least five electric current input pins of the first charging port are arranged to receive electric current output pins of an electric vehicle charging plug therein, wherein the charging port is configured to receive a first input voltage through at least some of the at least five electric current input pins, wherein the first input voltage is configured to charge the at least one battery;
      a first power supply port disposed in electrical communication with the at least one battery, wherein the first power supply port is configured to deliver a first output voltage supplied by the at least one battery;
      a second power supply port disposed in electrical communication with the at least one battery, wherein the second power supply port is configured to deliver a second output voltage supplied by the at least one battery, and wherein the second output voltage is greater than the first output voltage; and
      a communication module configured to communicate with an electric vehicle charging station configured to output the first input voltage through the electric vehicle charging plug, wherein the communication module includes at least one transmitter configured to communicate that the at least one battery is configured to receive the first input voltage;
   communicating, by the at least one transmitter of the communication module, with the electric vehicle charging station that the at least one battery is configured to receive the first input voltage through the electric vehicle charging plug;
   receiving the first charging input voltage from the electric vehicle charging station through the electric vehicle charging plug; and
   charging the at least one battery by the first input voltage received through the at least some of the at least five electric current input pins from the electric vehicle charging station.

18. The method according to claim 17, wherein the charging port includes at least seven pins, wherein at least one pin of the at least seven pins receives a direct current input current.

19. The method according to claim 17, further including supplying electrical power to charge an audiovisual device utilizing the first output voltage or the second output voltage delivered by the at least one battery.

* * * * *